(12) United States Patent
Taga et al.

(10) Patent No.: US 7,303,617 B1
(45) Date of Patent: *Dec. 4, 2007

(54) INK FOR INK-JET RECORDING

(75) Inventors: Yasuhiro Taga, Nagoya (JP); Tomoyo Hamajima, Nagoya (JP); Masaya Fujioka, Nagoya (JP); Kazuma Goto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/675,283

(22) Filed: Feb. 15, 2007

(30) Foreign Application Priority Data

Feb. 16, 2006 (JP) .............................. 2006-038770

(51) Int. Cl.
*C09D 11/00* (2006.01)
*C09D 11/02* (2006.01)

(52) U.S. Cl. ................................................. 106/31.49

(58) Field of Classification Search ............. 106/31.49
See application file for complete search history.

(56) References Cited

U.S. PATENT DOCUMENTS

| | | | | |
|---|---|---|---|---|
| 4,766,327 A | * | 8/1988 | Fox | 106/31.58 |
| 4,786,327 A | * | 11/1988 | Wenzel et al. | 106/31.32 |
| 5,534,051 A | * | 7/1996 | Lauw | 106/31.43 |
| 5,536,306 A | * | 7/1996 | Johnson et al. | 106/31.49 |
| 5,626,655 A | * | 5/1997 | Pawlowski et al. | 106/31.27 |
| 5,858,075 A | * | 1/1999 | Deardurff et al. | 106/31.27 |
| 5,925,176 A | * | 7/1999 | Rehman | 106/31.43 |
| 5,948,154 A | * | 9/1999 | Hayashi et al. | 106/31.48 |
| 6,514,330 B1 | | 2/2003 | Kanaya et al. | |
| 6,641,257 B1 | * | 11/2003 | Shi et al. | 347/100 |
| 7,073,900 B2 | * | 7/2006 | Aoi et al. | 347/100 |
| 2005/0264600 A1 | * | 12/2005 | Moffatt et al. | 347/33 |
| 2006/0127272 A1 | * | 6/2006 | Saitmacher et al. | 422/28 |
| 2006/0152569 A1 | * | 7/2006 | Jinnou et al. | 347/105 |

FOREIGN PATENT DOCUMENTS

JP   2000-355665   12/2000

OTHER PUBLICATIONS

STN Reg File structure of Direct Blue 199, Nov. 1984, 2 pages.*
JP 2006038769 U.S. Appl. No. 11/675,286, filed Feb. 15, 2007, Corresponding to JP2006-038789.
JP 2006038772 U.S. Appl. No. 11/675,316, filed Feb. 15, 2007, Corresponding to JP2006-038772.

* cited by examiner

*Primary Examiner*—Helene Klemanski
(74) *Attorney, Agent, or Firm*—Banner & Witcoff, Ltd.

(57) ABSTRACT

An ink for ink-jet recording is provided in which C. I. Direct Blue 199 and a thiazole-based compound are used. In this ink, about 1 mol % to about 20 mol % of the total counter ions in C. I. Direct Blue 199 are ammonium ions or organic ammonium ions.

7 Claims, No Drawings

INK FOR INK-JET RECORDING

BACKGROUND OF THE INVENTION

1. Field of the Invention

The present invention relates to an ink for ink-jet recording.

2. Description of the Related Art

One of the important characteristics required of an ink for ink-jet recording is that the ink exhibits good light fastness. This is to prevent a reduction in image quality due to fading caused by exposing an ink-jet printed material to light. Therefore, a copper phthalocyanine dye exhibiting better light fastness than magenta and yellow dyes has been employed as a coloring agent of a cyan ink for ink-jet recording.

Another important characteristic required for an ink for ink-jet recording is that the ink resists the growth of mildew. When mildew grows in an ink, the mildew itself acts as a foreign material. Therefore, the ejection stability of an ink containing mildew from nozzles of an ink-jet head decreases, causing clogging of the nozzles. Hence, a thiazole-based compound is added as a mildew proofing agent to an ink for ink-jet recording, irrespective of whether a copper phthalocyanine dye is employed as a coloring agent or not (U.S. Pat. No. 6,514,330B1).

However, in an ink for ink-jet recording to which a mildew proofing agent composed of a thiazole-based compound is added, although the growth of mildew is suppressed, a further problem exists in that the formation of a precipitate is observed. In particular, this tendency is noted when a copper phthalocyanine dye is employed as a coloring agent. Occasionally, in order to prevent corrosion of metal materials in an ink passage of an ink-jet head, an anticorrosive agent composed of a benzotriazole-based compound is additionally added to the ink. However, a problem exists in this case also in that the formation of a precipitate in the ink is observed.

SUMMARY OF THE INVENTION

The present invention has been developed to solve the problems inherent in the conventional technology. It is an object of the invention to provide an ink for ink-jet recording in which, although C. I. Direct Blue 199 exhibiting excellent light fastness is used and a thiazole-based compound is also used, the mildew resistant properties of the ink are not impaired, and the formation of a precipitate in the ink is prevented.

The present inventors have found that the above object can be achieved by employing C. I. Direct Blue 199 and by replacing a certain proportion of the total counter ions in C. I. Direct Blue 199 with ammonium ions or organic ammonium ions. Therefore, the invention has been completed.

Accordingly, the present invention provides an ink for ink-jet recording, containing C. I. Direct Blue 199 and a thiazole-based compound, wherein about 1 mol % to about 20 mol % of total counter ions in the C. I. Direct Blue 199 are ammonium ions or organic ammonium ions.

DETAILED DESCRIPTION OF THE PREFERRED EMBODIMENTS

The ink for ink-jet recording of the present invention contains C. I. Direct Blue 199, exhibiting good light fastness, and a thiazole-based compound. Furthermore, in C. I. Direct Blue 199 employed in the present invention, about 1 mol % to about 20 mol %, often about 1 mol % to about 15 mol %, of the total counter ions in the dye structure are ammonium ions ($NH_4^+$) or organic ammonium ions. This is because, when the amount of ammonium ions or organic ammonium ions is less than 1 mol % based on the total amount of the counter ions in the dye, the formation of a precipitate, which may be caused by the thiazole-based compound, cannot be suppressed, causing a reduction in ejection stability. Conversely, when the amount of ammonium ions or organic ammonium ions exceeds 20 mol %, the risk of the formation of a precipitate originating from a rubber member increases. However, when about 1 mol % to about 20 mol % of the total counter ions in the dye are ammonium ions or organic ammonium ions, the formation of a precipitate can be suppressed even when an anticorrosive agent composed of a benzotriazole-based compound is also employed in the ink.

In this instance, the organic ammonium ion is an ammonium ion in which one to four of the hydrogen atoms of $NH_4^+$ are replaced by alkyl groups (for example, methyl groups, ethyl groups and the like) or hydroxyalkyl groups (for example, hydroxyethyl groups and the like). Examples of the organic ammonium ion include, but not limited to, a monomethylammonium ion, a dimethylammonium ion, a trimethylammonium ion, a tetramethylammonium ion and the like.

In the ink for ink-jet recording of the present invention, the amount of C. I. Direct Blue 199 is appropriately determined depending on the performance and required characteristics of the ink. Preferably, the amount of C. I. Direct Blue 199 based on the total weight of the ink for ink-jet recording is in the range of about 0.1 wt % to about 5 wt %. Furthermore, another dye may also be employed within the range which does not impair the effect of the invention.

C. I. Direct Blue 199 employed in the present invention is a dye represented by, for example, the general formula (1):

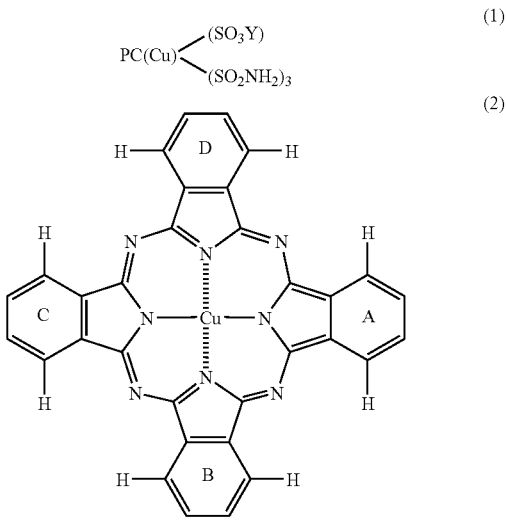

In the general formula (1), Pc(Cu) represents a copper phthalocyanine nucleus represented by the general formula (2). Each of $SO_3Y$ and $SO_2NH_2$ groups is present on any of four benzene rings A, B, C and D of the copper phthalocyanine nucleus represented by the general formula (2). Y in the $SO_3Y$ group represents a counter ion such as a hydrogen ion, a lithium ion, a sodium ion, a potassium ion, an ammonium ion, an organic ammonium ion and the like.

C. I. Direct Blue 199 can be produced by a known copper phthalocyanine substitution method having, for example, the following steps (i) and (ii).

Step (i)

First, copper phthalocyanine is chlorosulfonated with a chlorosulfonating agent. For example, an agent containing a mixture of chlorosulfonic acid and a chlorinating agent (phosphorus oxychloride or phosphorus trichloride) is employed as the chlorosulfonating agent. The molar ratio of the chlorosulfonic acid to the copper phthalocyanine compound (chlorosulfonic acid:copper phthalocyanine compound) is usually within the range of from 5:1 to 200:1. The molar ratio of the chlorinating agent to copper phthalocyanine (chlorinating agent:copper phthalocyanine) is usually within the range of from 0.5:1 to 10:1.

This chlorosulfonation reaction is carried out at a temperature ranging from 90° C. to 180° C. for 0.5 hours to 16 hours. Generally, the reaction time of the chlorosulfonation depends on the reaction temperature. The reaction time tends to be short as the reaction temperature is increased, and the reaction time tends to be long as the reaction temperature is decreased. Generally, temperature and time conditions for chlorosulfonation are in the range of 135° C. to 145° C. for 1.5 hours to 5.0 hours.

Furthermore, the chlorosulfonating agent may contain sulfuric acid. When the chlorosulfonating agent contains sulfuric acid, the molar ratio of sulfuric acid to the copper phthalocyanine compound (sulfuric acid:copper phthalocyanine compound) is usually within the range of from 0.3:1 to 2:1.

Step (ii)

Next, the product obtained in step (i) is condensed with ammonia or an organic amine such that about 1 mol % to about 20 mol % of the total counter ions in the product are replaced with ammonium ions or organic ammonium ions. Hence, C. I. Direct Blue 199 is obtained in which about 1 mol % to about 20 mol % of the total counter ions in the product are ammonium ions or organic ammonium ions.

Specifically, this step is performed at a reaction temperature of 0° C. to 50° C. using 3 wt % to 35 wt % of ammonium hydroxide or organic ammonium hydroxide. Generally, the reaction time depends on the reaction temperature. The reaction time tends to be short as the reaction temperature is increased, and the reaction time tends to be long as the reaction temperature is decreased. Generally, temperature and time conditions for the condensation reaction are a temperature of 0° C. to 45° C. for 0.5 hours to 24 hours.

The ink for ink-jet recording of the present invention contains a thiazole-based compound. The thiazole-based compound serves as a mildew proofing agent. Examples of the thiazole-based compound include, but not limited to, benzisothiazolin, isothiazolin, 1,2-benzisothiazolin-3-one, 5-chloro-2-methyl-4-isothiazolin-3-one, 2-(thiocyanomethylthio)benzthiazole, 2-mercaptobenzthiazole, 3-allyloxy-1,2-benzisothiazole-1,1-oxide and the like. Furthermore, a Proxel series (such as BDN, BD20, GXL, LV, XL2, Ultra10 and the like) manufactured by and available from Arch Chemicals, Inc. may be employed as the thiazole-based mildew proofing agent.

When the amount of the thiazole-based compound in the ink for ink-jet recording is too low, the mildew proofing effects are not observed. When the amount is too large, the risk of formation of a precipitate increases. Therefore, the amount of the thiazole-based compound based on the total amount of the ink for ink-jet recording is usually in the range of about 10 ppm to about 500 ppm and often in the range of about 100 ppm to about 500 ppm.

Preferably, the ink for ink-jet recording of the present invention further contains a benzotriazole-based compound in order to prevent corrosion of the metal material (particularly a 42 alloy (a nickel-iron alloy containing 42% nickel)) constituting the ink-jet head. In this instance, the corrosion may be caused due to contact between the ink and the metal material constituting the ink-jet head. Examples of the benzotriazole-based compound include, but not limited to, 1H-benzotriazole, 4-methyl-1H-benzotriazole, 5-methyl-1H-benzotriazole, sodium or potassium salts thereof and the like.

When the amount of the benzotriazole-based compound in the ink for ink-jet recording is too low, the anticorrosion effects are not observed. When the amount is too large, the risk of formation of a precipitate increases. Therefore, the amount of the benzotriazole-based compound based on the total amount of the ink for ink-jet recording is usually in the range of about 0.5 wt % or less, often in the range of about 0.01 wt % to about 0.5 wt %, and more often in the range of about 0.01 wt % to about 0.2 wt %.

A description will now be given of water and a water soluble organic solvent contained in the ink for ink-jet recording of the present invention.

The water employed in the present invention is preferably ion exchanged water containing a small amount of salts. The ink for ink-jet recording contains various components in predetermined amounts, and the balance is made up with water. Therefore, the amount of water used depends on the amounts of the other components. The amount of water based on the total amount of the ink for ink-jet recording is normally in the range of about 10 wt % to about 90 wt % and is often in the range of about 40 wt % to about 80 wt %.

Examples of the water soluble organic solvent employed in the present invention include, but not limited to, a humectant for mainly preventing drying of ink at the end portion of the nozzles of an ink-jet head and a penetrant for mainly increasing drying speed on paper.

Examples of the humectant include, but not limited to, lower alcohols such as methyl alcohol, ethyl alcohol, n-propyl alcohol, isopropyl alcohol, n-butyl alcohol, sec-butyl alcohol, tert-butyl alcohol and the like; amides such as dimethylformamide, dimethylacetamide and the like; ketones and keto-alcohols such as acetone, diacetone alcohol and the like; ethers such as tetrahydrofuran, dioxane and the like; polyalkylene glycols such as polyethylene glycol, polypropylene glycol and the like; alkylene glycols such as ethylene glycol, propylene glycol, butylene glycol, diethylene glycol, triethylene glycol, dipropylene glycol, tripropylene glycol, thiodiglycol, hexylene glycol and the like; glycerin; 2-pyrrolidone; N-methyl-2-pyrrolidone; 1,3-dimethyl-2-imidazolidinone; and the like. Of these, polyalcohols such as alkylene glycols, glycols and the like are suitable.

The amount of the humectant in the ink for ink-jet recording is generally in the range of about 95 wt % or less, often in the range of about 10 wt % to about 80 wt %, and more often in the range of about 10 wt % to about 50 wt % based on the total amount of the ink for ink-jet recording.

Furthermore, examples of the penetrant include, but not limited to, glycol-based ethers such as ethylene glycol methyl ether, ethylene glycol ethyl ether, ethylene glycol propyl ether, diethylene glycol methyl ether, diethylene glycol ethyl ether, diethylene glycol propyl ether, triethylene glycol methyl ether, triethylene glycol ethyl ether, triethylene glycol propyl ether, propylene glycol methyl ether, propylene glycol ethyl ether, propylene glycol propyl ether, dipropylene glycol methyl ether, dipropylene glycol ethyl ether, dipropylene glycol propyl ether, tripropylene glycol methyl ether, tripropylene glycol ethyl ether, tripropylene glycol propyl ether and the like.

The amount of the penetrant in the ink for ink-jet recording is generally in the range of about 20 wt % or less, often in the range of about 0.1 wt % to about 15 wt % and more often in the range of about 1 wt % to about 10 wt % based on the total amount of the ink for ink-jet recording. It should be noted that, when the amount of the penetrant is too large, the penetrability of ink to paper becomes excessively high to cause blurring.

The ink for ink-jet recording of the present invention may contain other conventionally known additives including: viscosity modifiers such as polyvinyl alcohol, cellulose, water soluble resin and the like; surface tension modifiers; and the like in accordance with need.

The ink for ink-jet recording of the present invention can be prepared by uniformly mixing C. I. Direct Blue 199, the thiazole-based compound, water, the water soluble organic solvents and, if necessary, other various additives by means of routine methods.

EXAMPLES

Examples 1 to 7 and Comparative Examples 1 to 4

The components of each of ink compositions shown in Table 1 were mixed uniformly, thereby preparing each ink for ink-jet recording. Here, each of dyes A to H is C. I. Direct Blue 199. However, the proportion of ammonium ions in the total counter ions is 1.5 mol % for the dye A, 6 mol % for the dye B, 11 mol % for the dye C, 15 mol % for the dye D, 20 mol % for the dye E, 0 mol % for the dye F, 0.5 mol % for the dye G and 40 mol % for the dye H. In each of the above dyes, the rest of the counter ions are sodium ions.

Ammonium ions present in the dyes was measured using a DX-500 series (product of Nippon Dionex K.K.). During the measurement, an IonPac® CG16 column (product of Nippon Dionex K.K.) was employed as a separation column. The temperature of the thermostatic chamber was 45° C., and a CMMS III suppressor (4 mm, product of Nippon Dionex K.K.) was employed as a suppressor.

<<Evaluation>>

For each of the inks for ink-jet recording, the following evaluations were performed: storage stability (using filtration test), ejection stability, long-term ejection stability, mildew resistant properties, anticorrosive properties and rubber precipitating properties. A description of each of the evaluation tests is given below. The obtained results are shown in Table 1.

<Storage Stability (Filtration Test)>

Each of the inks for ink-jet recording (100 mL) was sealed in a glass container and left to stand in a thermostatic chamber at 60° C. for 14 days. Subsequently, 50 ml of the ink was filtrated through a hydrophilic membrane filter having a pore size of 0.2 μm, and the presence or absence of a precipitate on the membrane filter was observed visually and under a microscope. The storage stability was evaluated according to the following criteria.

A: A precipitate is not present on the membrane filter.
C: A precipitate is present on the membrane filter.

<Ejection Stability>

Each of the inks for ink-jet recording was filled into a desired ink cartridge, and the ink cartridge was attached to a digital multifunction device equipped with an ink-jet printer (DCP-110C, product of Brother Industries, Ltd.). Then, 100 million dots (about 30 thousand sheets) were continuously printed, and the ejection stability was evaluated according to the following criteria.

AA: No non-ejection and ejection bending occur during continuous printing.
A: Non-ejection or ejection bending occurs to a small extent during continuous printing. The non-ejection or ejection bending is rectified by repeating purging at most five times.
C: Non-ejection and ejection bending occurs to a large extent during continuous printing. Neither the non-ejection nor ejection bending is rectified in a short time.

<Long-Term Ejection Stability>

After the above detailed ejection stability test was completed, the digital multifunction device equipped with an ink-jet printer (DCP-110C) with the ink cartridge attached thereto was left to stand in a thermostatic chamber at 60° C. for two weeks. Subsequently, 100 million dots (about 30 thousand sheets) were continuously printed again, and the long-term ejection stability was evaluated according to the following criteria.

AA: No non-ejection and ejection bending occur during continuous printing.
A: Non-ejection or ejection bending occurs to a small extent during continuous printing. The non-ejection or ejection bending is rectified by repeating purging at most five times.
C: Non-ejection and ejection bending occurs to a large extent during continuous printing. Neither the non-ejection nor ejection bending is rectified in a short time.

<Mildew Resistant Properties>

The cap of each of the food stamps used for bacterial test (for viable bacterium and for fungi, products of NISSUI PHARMACEUTICAL CO., LTD.) was removed, and a sufficient amount of one of the inks for ink-jet recording was applied to the surface of each of the agar mediums. Each of the food stamps was left to stand for 10 hours without the cap to facilitate the adhesion of the bacteria. Subsequently, the cap was placed back on. For the food stamps used to provide a viable bacterium, cultivation was carried out in a thermostatic chamber at 36° C. for two days. For the food stamps used for fungi, cultivation was carried out in a thermostatic chamber at 23° C. for five days. Each of the food stamps was observed visually, and the mildew resistant properties were evaluated according to the following criteria.

A: No growth of mildew is observed.
C: The growth of mildew is observed.

<Anticorrosive Properties>

In order to prepare metal member sample pieces, a metal material employed in an ink-jet head member was cut into a strip shape with dimensions of 50 mm length, 10 mm width and 2 mm thickness. The metal member sample pieces were immersed in 10 mL of each of the inks for ink-jet recording in sealed containers and were left to stand in a thermostatic chamber at 60° C. for two weeks. Subsequently, the immersed metal member sample pieces were removed and observed visually and under a microscope. The anticorrosive properties were evaluated according to the following criteria.

AA: The sample piece is not stained and not corroded.
A: The sample piece is slightly stained but not corroded.
C: The sample piece is stained and corroded.

<Rubber Precipitating Properties>

A rubber sample was cut into a strip shape with dimensions of 50 mm length, 10 mm width and 2 mm thickness was immersed in 10 mL of each of the inks for ink-jet recording in a sealed container and was left to stand in a thermostatic chamber at 60° C. for two weeks. Subsequently, the immersed sample was removed, and the whole amount of the ink after the removal of the sample was filtrated through an electroformed filter (with a pore size of 13 μm and an effective filtration area of 8 $cm^2$) to measure the time required for the filtration of each ink. In addition to this, as a control, each of the inks to which a rubber sample was not added was left to stand under the same conditions as above (at 60° C. for two weeks) and was filtrated through an electroformed filter having the same specification as above to measure the time required for the filtration (to provide the reference time). For each of the inks in which a rubber sample was immersed, the percentage of time required for the filtration with respect to the reference time was determined. The rubber precipitating properties were evaluated according to the following criteria. Furthermore, the electroformed filters after filtration were observed under a microscope, and there was a trend that the larger the percentage of time required for the filtration with respect to the reference time, the larger the amount of a precipitate observed.

AA: The required filtration time is less than 130% of the reference time.

A: The required filtration time is at least 130% and less than 200% of the reference time.

B: The required filtration time is at least 200% and less than 400% of the reference time.

C: The required filtration time is at least 400% of the reference time.

<Overall Evaluation>

Based on the above evaluation results, an overall evaluation was conducted according to the following criteria.

G: All of the evaluation results are AA or A.

NG: The evaluation results contain B or C.

The ink for ink-jet recording of Example 1 (where the amount of dye=4.0 wt %) contains a thiazole-based compound. In this ink, the dye D is employed in which 15 mol % of the total counter ions in the dye structure are ammonium ions. Therefore, the ink exhibits excellent mildew resistant properties. In addition to this, although the ink contains the thiazole-based compound, a precipitate was not formed, and thus the ink could be stably ejected all the time. Furthermore, the attacking properties on rubber were low, and thus the formation of a precipitate originating from the rubber member was prevented. Also, because the ink for ink-jet recording of Example 1 does not contain a benzotriazole-based compound, the metal member was found to be stained only slightly in the test for anticorrosive properties and did not suffer from corrosion. Therefore, this ink did not cause any practical problems.

The ink for ink-jet recording of Example 2 (where the amount of dye=0.5 wt %) contains a thiazole-based compound and a benzotriazole-based compound. In this ink, the dye A is employed in which 1.5 mol % of the total counter ions in the dye structure are ammonium ions. Therefore, the ink exhibits excellent mildew resistant properties and excellent anticorrosive properties. In addition to this, although the ink contains the thiazole-based compound and the benzotriazole-based compound, a precipitate was not formed, and thus the ink could be stably ejected all the time. Furthermore, the attacking properties on rubber were low, and thus the formation of a precipitate originating from a rubber member was prevented.

The ink for ink-jet recording of Example 3 (where the amount of dye=1.2 wt %) contains a thiazole-based compound and a benzotriazole-based compound. In this ink, the dye B is employed in which 6 mol % of the total counter ions in the dye structure are ammonium ions. Therefore, the ink exhibits excellent mildew resistant properties and excellent

TABLE 1

|  | Ex. 1 | Ex. 2 | Ex. 3 | Ex. 4 | Ex. 5 | Ex. 6 | Ex. 7 | Com Ex. 1 | Com Ex. 2 | Com Ex. 3 | Com Ex. 4 |
|---|---|---|---|---|---|---|---|---|---|---|---|
| Ink composition (% by weight) | | | | | | | | | | | |
| Dye A (ammonium ion ratio *[1] = 1.5 mol %) | — | 0.5 | — | — | — | — | — | — | — | — | — |
| Dye B (ammonium ion ratio *[1] = 6 mol %) | — | — | 1.2 | — | — | — | — | — | — | — | — |
| Dye C (ammonium ion ratio *[1] = 11 mol %) | — | — | — | 2.4 | — | — | 4.8 | — | — | — | 4.0 |
| Dye D (ammonium ion ratio *[1] = 15 mol %) | 4.0 | — | — | — | 3.3 | — | — | — | — | — | — |
| Dye E (ammonium ion ratio *[1] = 20 mol %) | — | — | — | — | — | 4.0 | — | — | — | — | — |
| Dye F (ammonium ion ratio *[1] = 0 mol %) | — | — | — | — | — | — | — | 4.0 | — | — | — |
| Dye G (ammonium ion ratio *[1] = 0.5 mol %) | — | — | — | — | — | — | — | — | 4.0 | — | — |
| Dye H (ammonium ion ratio *[1] = 40 mol %) | — | — | — | — | — | — | — | — | — | 4.0 | — |
| Glycerin | 27.0 | 27.0 | 27.0 | 27.0 | 27.0 | 27.0 | 27.0 | 27.0 | 27.0 | 27.0 | 27.0 |
| Triethylene glycol butyl ether | 5.0 | 5.0 | 5.0 | 5.0 | 5.0 | 5.0 | 5.0 | 5.0 | 5.0 | 5.0 | 5.0 |
| Benzotriazole | — | 0.1 | 0.1 | 0.1 | 0.1 | 0.1 | 0.1 | 0.1 | 0.1 | 0.1 | — |
| OLFINE ® E1010 *[2] | 0.2 | 0.2 | 0.2 | 0.2 | 0.2 | 0.2 | 0.2 | 0.2 | 0.2 | 0.2 | 0.2 |
| Proxel XL-2(S) *[3] | 0.2 | 0.2 | 0.2 | 0.2 | 0.2 | 0.2 | 0.2 | 0.2 | 0.2 | 0.2 | — |
| Water | | | | | | Balance | | | | | |
| Evaluation | | | | | | | | | | | |
| Storage stability (filtration test) | A | A | A | A | A | A | A | C | C | A | A |
| Ejection stability | A | AA | AA | AA | AA | AA | AA | C | C | AA | A |
| Long-term ejection stability | A | AA | AA | AA | AA | A | AA | C | C | C | C |
| Mildew resistant properties | A | A | A | A | A | A | A | A | A | A | C |
| Anticorrosive properties | A | AA | AA | AA | AA | AA | AA | AA | AA | AA | A |
| Rubber precipitating properties | AA | AA | AA | AA | AA | A | AA | AA | AA | C | AA |
| Overall evaluation | G | G | G | G | G | G | G | NG | NG | NG | NG |

*[1] Ratio of ammonium ions to total counter ions in dye
*[2] Acetylene glycol-based surfactant (product of Nissin Chemical Industry Co., Ltd.)
*[3] Active ingredient = 1,2-benzisothiazolin-3-one; active ingredient concentration = 10 wt %; Mildew proofing agent (product of Arch Chemicals, Inc.)

anticorrosive properties. In addition to this, although the ink contains the thiazole-based compound and the benzotriazole-based compound, a precipitate was not formed, and thus the ink could be stably ejected all the time. Furthermore, the attacking properties on rubber were low, and thus the formation of a precipitate originating from a rubber member was prevented.

The ink for ink-jet recording of Example 4 (where the amount of dye=2.4 wt %) contains a thiazole-based compound and a benzotriazole-based compound. In this ink, the dye C is employed in which 11 mol % of the total counter ions in the dye structure are ammonium ions. Therefore, the ink exhibits excellent mildew resistant properties and excellent anticorrosive properties. In addition to this, although the ink contains the thiazole-based compound and the benzotriazole-based compound, a precipitate was not formed, and thus the ink could be stably ejected all the time. Furthermore, the attacking properties on rubber were low, and thus the formation of a precipitate originating from a rubber member was prevented.

The ink for ink-jet recording of Example 5 (where the amount of dye=3.3 wt %) contains a thiazole-based compound and a benzotriazole-based compound. In this ink, the dye D is employed in which 15 mol % of the total counter ions in the dye structure are ammonium ions. Therefore, the ink exhibits excellent mildew resistant properties and excellent anticorrosive properties. In addition to this, although the ink contains the thiazole-based compound and the benzotriazole-based compound, a precipitate was not formed, and thus the ink could be stably ejected all the time. Furthermore, the attacking properties on rubber were low, and thus the formation of a precipitate originating from a rubber member was prevented.

The ink for ink-jet recording of Example 6 (where the amount of dye=4.0 wt %) contains a thiazole-based compound and a benzotriazole-based compound. In this ink, the dye E is employed in which 20 mol % of the total counter ions in the dye structure are ammonium ions. Therefore, the ink exhibits excellent mildew resistant properties and excellent anticorrosive properties. In addition to this, although the ink contains the thiazole-based compound and the benzotriazole-based compound, a precipitate was not formed, and thus the ink could be stably ejected all the time. Furthermore, the attacking properties on rubber were low, and thus the formation of a precipitate originating from a rubber member was prevented.

The ink for ink-jet recording of Example 7 (where the amount of dye=4.8 wt %) contains a thiazole-based compound and a benzotriazole-based compound. In this ink, the dye C is employed in which 11 mol % of the total counter ions in the dye structure are ammonium ions. Therefore, the ink exhibits excellent mildew resistant properties and excellent anticorrosive properties. In addition to this, although the ink contains the thiazole-based compound and the benzotriazole-based compound, a precipitate was not formed, and thus the ink could be stably ejected all the time. Furthermore, the attacking properties on rubber were low, and thus the formation of a precipitate originating from a rubber member was prevented.

On the other hand, the ink for ink-jet recording of Comparative Example 1 (where the amount of dye=4.0 wt %) contains a thiazole-based compound and a benzotriazole-based compound. In this ink, the dye F is employed in which none of the counter ions in the dye structure are ammonium ions. Therefore, although the ink exhibits excellent mildew resistant properties and excellent anticorrosive properties, the formation of a precipitate probably originating from the thiazole-based compound and the benzotriazole-based compound was observed. Thus, the results of storage stability, ejection stability and long-term ejection stability were unsatisfactory. However, the attacking properties on rubber were low.

The ink for ink-jet recording of Comparative Example 2 (where the amount of dye=4.0 wt %) contains a thiazole-based compound and a benzotriazole-based compound. In this ink, the dye G is employed which contains ammonium ions in an amount of only 0.5% based on the total counter ions in the dye structure. Therefore, although the ink exhibits excellent mildew resistant properties and excellent anticorrosive properties, the formation of a precipitate probably originating from the thiazole-based compound and the benzotriazole-based compound was observed. Thus, the results of storage stability, ejection stability and long-term ejection stability were unsatisfactory. However, the attacking properties on rubber were low.

The ink for ink-jet recording of Comparative Example 3 (where the amount of dye=4.0 wt %) contains a thiazole-based compound and a benzotriazole-based compound. In this ink, the dye H is employed which contains ammonium ions in an amount of 40 mol % based on the total counter ions in the dye structure. Therefore, the ink exhibits excellent mildew resistant properties and excellent anticorrosive properties, and the results of the storage stability and ejection stability were favorable. However, the attacking properties on the rubber member were strong, and thus a precipitate originating from the rubber member was formed. Therefore, the long-term ejection stability was unsatisfactory.

In the ink for ink-jet recording of Comparative Example 4 (where the amount of dye=4.0 wt %), the dye C is employed in which 11 mol % of the total counter ions in the dye structure are ammonium ions. Therefore, the attacking properties on the rubber member were low, and thus a precipitate originating from the rubber member was not observed. However, because a thiazole-based compound was not included in the ink, mildew was observed in the ink, and thus the long-term ejection stability was unsatisfactory. Furthermore, because the ink for ink-jet recording of Comparative Example 4 does not contain a benzotriazole-based compound, the metal member was found to be stained slightly in the test for anticorrosive properties but did not suffer from corrosion. Therefore, this ink did not cause any practical problems.

The entire disclosure of the specification, claims and summary of Japanese Patent Application No. 2006-38770 filed on Feb. 16, 2006 is hereby incorporated by reference.

What is claimed is:

1. An ink for ink-jet recording, comprising C. I. Direct Blue 199 and a thiazole-based compound, wherein about 1 mol % to about 20 mol % of total counter ions in the C. I. Direct Blue 199 are ammonium ions or organic ammonium ions.

2. The ink for ink-jet recording according to claim 1, wherein an amount of the C. I. Direct Blue 199 is about 0.1 wt % to about 5.0 wt %, based on a total amount of the ink for ink-jet recording.

3. The ink for ink-jet recording according to claim 1, wherein an amount of the thiazole-based compound is about 10 ppm to about 500 ppm, based on a total amount of the ink for ink-jet recording.

4. The ink for ink-jet recording according to claim 1, wherein the thiazole-based compound is benzisothiazolin, isothiazolin, 1,2-benzisothiazolin-3-one, 5-chloro-2-methyl-4-isothiazolin-3-one, 2-(thiocyanomethylthio)benzthiazole, 2-mercaptobenzthiazole or 3-allyloxy-1,2-benzisothiazole-1,1-oxide.

5. The ink for ink-jet recording according to claim 1, further comprising a benzotriazole-based compound.

6. The ink for ink-jet recording according to claim 5, wherein an amount of the benzotriazole-based compound is about 0.5 wt % or less, based on a total amount of the ink for ink-jet recording.

7. The ink for ink-jet recording according to claim 5, wherein the benzotriazole-based compound is 1H-benzotriazole, 4-methyl-1H-benzotriazole, 5-methyl-1H-benzotriazole, sodium or potassium salts thereof.

* * * * *